United States Patent [19]

Schnetz

[11] Patent Number: 4,564,176
[45] Date of Patent: Jan. 14, 1986

[54] HYDRAULIC DASHPOT

[75] Inventor: Rainer Schnetz, Munich, Fed. Rep. of Germany

[73] Assignee: Firma Albert Schnetz, Fed. Rep. of Germany

[21] Appl. No.: 573,608

[22] Filed: Jan. 25, 1984

[30] Foreign Application Priority Data

Jan. 28, 1983 [DE] Fed. Rep. of Germany ....... 3302790

[51] Int. Cl.$^4$ .............................................. F16F 9/34
[52] U.S. Cl. .................................. 267/64.11; 267/118
[58] Field of Search ............... 267/64.11, 64.13, 64.15, 267/113, 118, 124, 126, 127, 136

[56] References Cited

U.S. PATENT DOCUMENTS

| 1,289,132 | 12/1918 | Eaton | 267/64.11 |
| 1,519,851 | 12/1924 | Liebau | 267/64.11 |
| 2,101,265 | 12/1937 | Mercier | 267/64.11 |

FOREIGN PATENT DOCUMENTS

| 911466 | 5/1954 | Fed. Rep. of Germany ... 267/64.11 |
| 492751 | 9/1938 | United Kingdom ............ 267/64.11 |

Primary Examiner—Duane A. Reger
Attorney, Agent, or Firm—McGlew and Tuttle

[57] ABSTRACT

A hydraulic dashpot has a high pressure space and a low pressure space into which the hydraulic fluid is forced through a spring loaded and adjustable spill valve when the dashpot is acted upon by a blow to be damped. The low pressure space is divided up into two sections on the two sides of the high pressure space and axially in line with it. The spill valve is fixed in the cylinder of the dashpot rather than being mounted on or in the piston. There is a pipe joining the two sections of the low pressure space together and running through the high pressure space and through the spill valve. The check valve for letting the piston be returned into its starting position is formed by a ring on the piston.

20 Claims, 3 Drawing Figures

HYDRAULIC DASHPOT

BACKGROUND OF THE INVENTION

The present invention concerns dashpots and more particularly hydraulic dashpots of the sort having a piston with at least one port therethrough and a cylinder such that when the piston is moved into the cylinder by a force to be damped liquid is moved by the piston through an adjustable transfer or spill valve into a low pressure space and when the force is no longer acting on the piston the liquid makes its way back out of the low pressure space into the piston cylinder through a check valve.

DISCUSSION OF THE PRIOR ART

Such dashpots are used for example for damping the motion of moving masses, more specially in materials handling systems, in pneumatic drives and in customized apparatus. One past design of such a dashpot with some of the design details noted herein is to be seen in the German Gebrauchsmuster patent No. 7,929,707. This dashpot had pressure-dependent damping function and was made up of a hydraulic cylinder whose piston was moved axially by a piston rod and had ports therethrough. There was a striking face on one end of the piston rod clear of the cylinder to be acted upon by the moving mass or machine part whose motion was to be damped. The piston was sealingly placed in the cylinder so that same was walled off into two parts, that herein are named the high pressure and the low pressure spaces. When a force took effect on the piston rod the hydraulic liquid in the high pressure space of the cylinder was put under pressure and forced into the low pressure space through an adjustable spill valve. Adjustment of the valve for this reason made it possible for the damping or shock absorbing effect to be changed as needed. This prior art dashpot was designed with a piston return means in the form of a mechanical return spring so that when the piston rod was no longer acted upon by the force the piston was moved back towards its starting position, hydraulic liquid then making its way through a check valve out of the low pressure space into the high pressure one.

This known design of dashpot had a number of different shortcomings that as far as possible are to be taken care of by the present invention. The first shortcoming is that in the known dashpot the spill or transfer valve was mounted on the piston rod like the piston itself. The spill valve was made up of a headpiece against which the piston, acting as a valve member, was moved by the force of a Belleville washer spring, that was supported on a driver ring screwed onto the piston rod. It will be seen that in this design the piston rod not only had the piston on it acting on the high pressure space but furthermore the complete spill valve unit to make possible motion of hydraulic liquid out of the high pressure space into the low pressure space. For this reason the inertia of the parts on the piston was relatively large. On a force suddenly acting on the end of the piston rod all these parts would firstly have to be accelerated before there was any damping effect. For this reason this known design of dashpot had a slow response and was of less use for damping blows with a high repetition rate. The placing of the spill valve on the piston rod furthermore made upkeep and adjustment of the valve harder inasfar as to make any change in the loading effect of the Belleville washers the driving ring has to be screwed on the piston rod. To do this it was first necessary for the piston rod to be pulled out from the cylinder as far as it would go so that the driving ring came up against a support ledge. In this position it was then possible for the piston rod to be screwed further into or out of the threaded hole in the driving ring. That is to say, before any adjustment of the belleville washer spring might be undertaken it was first necessary for the piston of the dashpot to be moved out of its working position in the middle part of the cylinder into an end position so that the dashpot was put out of operation for some time. In fact there was no chance of making any change in the effect of the Belleville washer spring, that is to say in the damping function of the dashpot, while it was being used. A further point is that there was some chance of loss of adjustment of the driving ring on operation of the dashpot in keeping with the prior art. Undesired motion of the ring out of its desired position as adjusted for was all the more to be feared inasfar as the ring, like the complete spill valve unit, was acted upon by the sharp forces taking effect on the dashpot and there was a rigid mechanical coupling between the piston rod and the valve.

This is furthermore the reason that the light contact between the mechanical spring elements and the piston rod, taking up the forces or blows, was a shortcoming. In the prior art dashpot there was such a light contact between the piston and the Belleville washer spring on the one hand and on the other hand between the piston and the return spring that was in the form of a mechanical spring. These spring elements were directly acted upon by the vibrations of the piston rod and in the long run material fatigue was the likely outcome.

Lastly the division up of the unit into a high pressure and a low pressure space was not specially to be desired because, as we have seen, the inside of the hydraulic cylinder was separated into a high pressure space and a low pressure one, each taking up one axial half side of the cylinder. In this case the one half of the cylinder forming the high pressure space with all the stoppers, seals and the like was acted upon by the higher pressure produced when the piston rod was acted upon by a blow. These parts then have to be made strong enough to see that they are not damaged by the pressure surges produced. Nevertheless there would always be the chance of leakage through the seals of the high pressure space and if the piston rod is acted upon by a very powerful force there would even be a chance of the cylinder bursting. Another point not to be overlooked was that having a high pressure space on one side of a piston and a low pressure space on the other side thereof made the system of less value for high frequency damping, when the piston rod was to be moved at a very high speed. The effect of a kick or blow moving the piston at a very high speed was likely to be responsible for the production of a vacuum on the low pressure side for a short time and then air may be taken up from the outside into the low pressure space. The exchange of liquid as such between a high pressure space and a low pressure side or space by way of the spill valve was as such not a good way of taking care of these troubles likely in the case of damping high frequency forces.

SHROT OVERVIEW OF THE PRESENT INVENTION

One purpose of the present invention is that of designing a dashpot of the sort noted for use with high-speed parts, whose damping function may be adjusted while the dashpot is in operation.

A further purpose of the invention is that of designing a dashpot in which there is no chance whatever of leakage through outside seals.

In keeping with a further part of the purpose or object of the invention the dashpot is to be highly trouble-free while at the same time being simple in structure and with respect to upkeep and on the other hand low in price to make.

For effecting this and other purposes a dashpot of the sort in question is so designed that the pressure dependent spill or transfer valve is placed stationarily in the inside of the cylinder. Further developments of the main idea of the present invention are covered in the claims.

Further useful effects and details of the invention will be seen from the account now to be given on one working example that will be seen in figures.

LIST OF DIFFERENT VIEWS OF THE FIGURES

DETAILED ACCOUNT OF WORKING EXAMPLE OF THE INVENTION

Figures 1, 2:
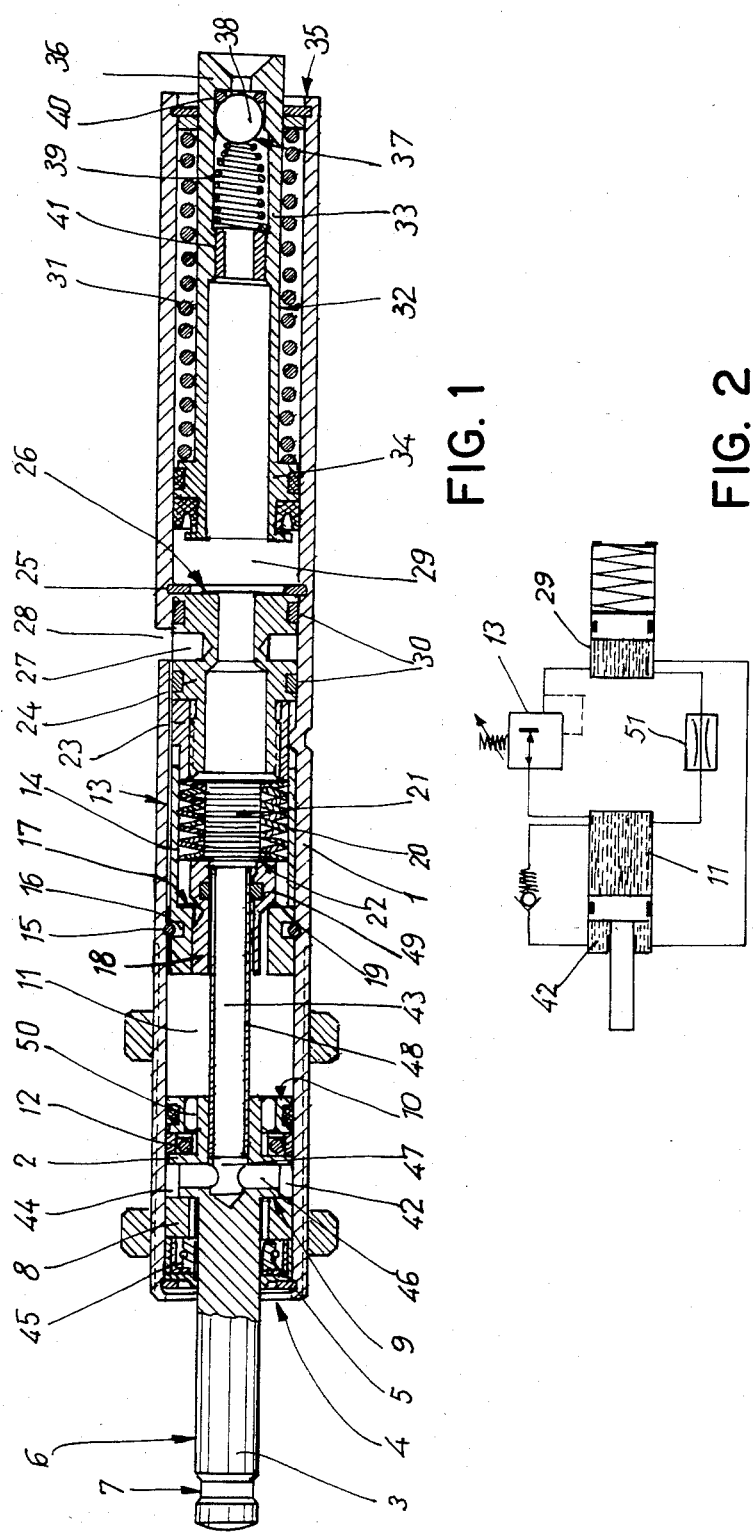
FIG. 1 is an axial section of one working example of a dashpot in keeping with the present invention.
FIG. 2 is a hydraulic circuit schematic of the dashpot.
Figure 3:
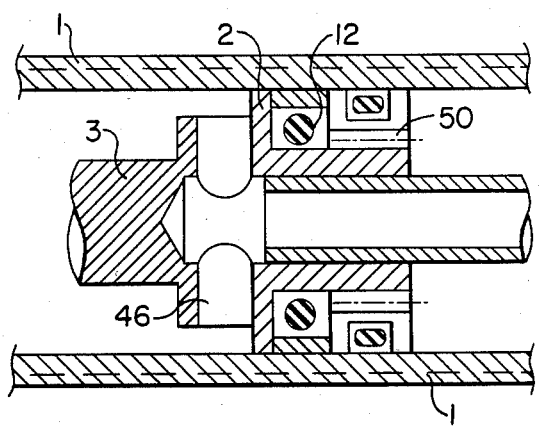
FIG. 3 is an axial sectional view, on an enlarged scale, of the piston within the cylinder.

The dashpot in keeping with the invention has a cylinder 1 with an axially moving piston 2 therein. The piston is moved by a piston rod 3, that in the present working example is made in one piece with the piston and has its end opposite to the piston running out through an end plate 4 of the cylinder to the ouside. It is sealed off by a stuffing box 5 in the end wall or plate. The stuffing box 5 at the same time has the function of a support bearing for the piston rod 3. The end 6 of the piston rod 3 outside the cylinder 1 is acted upon by forces that are to be damped and are in the main axially directed in relation to the cylinder 1. In this connection the end 6 of the piston rod may have a pad (not in the figure) fixed on it or it may have a ring groove 7 running round it for producing a mechanical joint between the piston rod and a structure that is moved along a given path. In this way the motion of the structure is transmitted from the structure to the piston rod 3. By way of the piston rod 3 the motion is transmitted to the piston 2 that is moved axially within the cylinder, pumping the hydraulic liquid in therein.

In FIG. 1 the piston 2 will be seen in one end position at the left hand end of the cylinder 1 so that the piston 2 is rested against a bush 8 forming a stop for limiting axial motion of the piston 2 in the cylinder in one direction. The piston 2 is generally cylindrical. Its piston rod side 9 is in the form of a stop face that is pushed up against the bush 8. The opposite side 10 of the piston that is turned away from the piston rod 3 has the function of a wall at one end of the part of the cylinder 1 that is filled with hydraulic liquid and which herein will be named the high pressure space or chamber. The piston 2 has a piston seal ring 12 mounted in a groove in its outer face for running on the inner face of the cylinder wall and guiding the piston 2 on the same being moved backwards and forwards along the piston cylinder. This ring 12 has a check valve function as will be made clear in more detail hereinafter. The ring is so designed that when the piston 2 is moved to the right out of the end position to be seen in FIG. 1 axially, the ring 12 makes sealing contact with the cylinder 1. The hydraulic liquid in the high pressure space 11 is then put under pressure by the motion of the piston 2 and pumped into the low pressure space of the cylinder 1 through an adjustable spring-loaded spill or overspill valve 13 so that a dashpot or shockabsorbing function is made possible.

The spill valve 13 is placed at the end of the high pressure space 11 furthest from the piston 2. The valve 13 has a valve seat member 14 that is fixed in position on the wall of the cylinder 1. Fixed valve seat member 4 forms cylinder space dividing means which cooperates with piston 2, to wall off high pressure liquid space 11. And as a connection for this purpose it is possible to have a circlip 15 fitting into ring grooves 16 in the valve seat member 14 and the cylinder 1. The valve seat member 14 has the form of cylindrical sleeve with a concentric step therein functioning as a rest face or seat for a valve member 18 running coaxially in the valve seat member 14. A coned outer face 19 of the valve member 18 is liquid tightly pressed against the step 17. The valve member 18 is in this respect kept up against the valve seat member 14 by a spring system. The spring may be adjusted so that the force thereof on the valve seat is changed.

In the present working example of the invention the spring system is made up of a Belleville washer spring 20 functioning as a compression spring. The Belleville washer spring 20 is made up of a number of separate ring-like spring elements that each has an opening 21 therethrough near the axis of the cylinder 1, as will be make clear in more detail hereinafter. The one end of the Belleville washer spring is placed against the end face 22 of the valve member 18, that is acted upon by the spring force thereof. The other axial end of the Belleville washer spring 20 is placed against a support or driving ring 23 that may be adjusted in position inside the cylinder 1 in the axial direction. The driving ring 23 is for this purpose screwed on an adjustment sleeve 24, that may be worked through the wall of the cylinder in such a way that the axial position of the driving ring 23 and for this reason the force of the Belleville washer spring 20 is changed. The driving ring 23 is keyed in the cylinder 1 so that it may be moved axially therein but may not be turned in relation thereto. By contrast the adjustment sleeve 24 may be turned in the cylinder 1 but there are means keeping it from being moved axially therein. These means may in the present case be a circlip 25 taken up in a ring groove in the inner face of the cylinder 1 and forming a stop member for the end 26 of the adjustment sleeve 24 furthest from the Belleville washer spring 20. By the force of the Belleville washer spring 20 the adjustment sleeve 24 is kept up against the circlip 25 so that the sleeve may not be moved axially. To make it possible for the adjustment sleeve 24 to be turned it has a number of radial blind holes 27 running in from its outer face. To get at these holes 27 there are slots in the wall of cylinder 1 so that a driving lever may be pushed into the holes from the outside. The size of the slots 28 in the wall of the cylinder 1 is in this respect made of such a round-the-axis length that it is at least as large as the angle between one blind hole 27 and the next. In this way it is possible for the adjustment sleeve 24 to be turned in the cylinder 1 in steps, the driving lever being placed firstly in one hole and then in the next one thereto. Because of the presence of the thread on the driving ring 23 the turning motion of the adjustment sleeve is translated into an axial motion of the driving ring 23, that, as we have seen, is keyed in the cylinder so that it may not be turned in relation to it. The axial motion of the driving ring 23 is directly responsible for a change in the force of the spring acting on the valve.

In keeping with the invention the spill valve made up of the parts as noted is placed stationarily in the inside of the cylinder 1, it being kept in place by the circlip 15 and the driving ring 23. With this system the piston may be designed with a low weight so that there is a high response speed of the dashpot to blows or impacts producing with a high repetition rate. Another point is that the spill valve 13 is only made up of lengths of bush with a hollow space near the middle axis of the cylinder 1.

This space is filled up with hydraulic liquid and is part of the low pressure space of the dashpot of the present invention, that is to say it is part of a first low pressure space 29.

This low pressure space 29 is sealed off by o-rings 30 stopping liquid making its way between the cylinder 1 and the right hand end of the sleeve 24 into the slots 28. The low pressure space 29 is the part inside the cylinder 1 coming after the spill valve 13. In keeping with a useful further development of the invention in this part of the space within the cylinder there is a balancing or compensating piston 32 acted upon by a return spring 31 so that a desired working pressure of the hydraulic liquid may be kept up in the low pressure space 29 and so that the piston 2 is pushed to the left (because, in view of the differential piston effect of the piston rod 3, the volume of liquid in the cylinder section to be seen on the left in FIG. 2 will be greater when the piston 2 is on the left than when it is on the right. For this reason the supply of liquid to both ends of the cylinder under pressure will be responsible for the piston being moved into the position in which the cylinder volume is greatest). The balancing piston 32 is in the form of a bell-like housing 33 having a collar 34 running liquid-tightly on the inner face of the wall of the cylinder. The return spring 31 is in the form of a compression spring placed between the collar 34 and the end wall or plate 35 of the cylinder furthest from the piston rod 3. The balancing piston 32 is guided inside the piston for sliding motion against the force of the return spring 31, the tail 36 of the piston 32 running through the end plate 35 of the cylinder to a greater or lesser degree dependent on the pressure in the low pressure space 29. When the balancing piston 32 has been moved into its pressure equilibrium position or working point there will be a balance between the forced produced by the return spring 31 and the hydraulic pressure in the low pressure space 29. In keeping with a useful further development of the invention a filling valve 37 may be present at the right hand end of the piston tail 36 to make it possible for the cylinder 1 to be topped up with hydraulic liquid. The filling valve has a ball valve member 38 that is kept pressed against a sealing ring 40 acting as a valve seat by a spring 39. The other end of the spring 39 is rested against a bush 41 forced fitted into the balancing piston 32.

As it is seen the first low pressure space 29 is in a part of the space in the cylinder that is walled off from the high pressure space 11 by the spill valve 13 and is axially lined up with the high pressure space, that is to say it is at one end thereof. In keeping with one of the main teachings of the present invention there are low pressure spaces 29 and 42 at the two ends of the high pressure space 11 in the cylinder 1. These two low pressure spaces or space sections are joined up with each other by way of duct 43 running through the high pressure space 11. That is to say, as part of the invention there is a second low pressure space 42 at the end of the cylinder opposite to the end thereof with the low pressure space 29. In FIG. 1 the second low pressure space will be seen with its smallest volume, because the piston 2 is at one end position. In this position of the piston the space 42 is formed by a ring gap 44 machined into the outer face of the piston 2. If however the piston 2 is moved into the cylinder 1 to the right by a blow acting on the left hand end of the piston rod 6, a space comes into being between the bush 8 and the left hand side 9 of the piston, such further space then being an addition to the low pressure space 42, that so far has only been in the gap 44. Furthermore the piston rod 3 is not necessarily sealingly fitted in the bush 8; if in fact liquid may make its way betwen the bush and the piston rod, the space 45 next to the stuffing box or rod seal 5 will be a further part of the second low pressure space 42. In the invention there is for this reason a number of different pressure spaces, that is to say the high pressure space 11 in the middle of the space inside the cylinder and the two low pressure spaces in the parts of the cylinder next to the high pressure space. In this respect the first low pressure space 29 is walled off from the high pressure space 11 by the spill valve 13. The second low pressure space 42 is separated and walled off by the piston ring 12, that is put between the high pressure space 11 and the ring gap 44 cut into the outer face of the piston.

There is a radial or crosswise hole 46 running for the ring gap 44 to the inside of the piston 2 and opening into an center hole 47 in the body of piston. In the hole 47, that comes in from the right hand side of the piston and does not go right through it, the left hand end of a tube 48 is force fitted so that it is mechanically joined to the piston 2. This tube 48 takes the form of a connection between the low pressure spaces 29 and 42. It may furthermore be looked upon as a part of the piston in the sense that it is moved axially with the piston in the cylinder 1, the said tube 48 running along the center axis of the cylinder 1 through the high pressure space 11 into the first low pressure space 29 walled off by the spill valve 13. To make this possible the valve member 18 has a center hole therethrough for the tube 48, there being an o-ring 49 seated in a groove in the member 18 to make a sealing joint between the member 18 and the tube 48. In the end position to be seen in FIG. 1 of the piston 2 the right hand end of the tube 48 is a little short of the Belleville washer spring 20. The diameter of the opening 21 through the Belleville washer spring 20 is of such a size that the tube 48 may be moved therein so that axial motion of the piston 2 to the necessary degree is possible. In other words the tube 48 makes possible a connection between the two low pressure spaces 29 and 42 whatever the position of the piston 2.

As a further part of the invention the piston ring 12 separating the second low pressure space 42 from the high pressure space 11 is designed with the function of a check valve. The groove cut into the outer face of the piston 2 to take up the piston ring 12 is of such a size that the piston ring 12 may be moved axially therein somewhat in relation to the piston. The groove is joined up by a number of axially running holes 50 with the high pressure space so that the pressure therein will take effect on the piston ring 12 as well. The piston ring 12 is floatingly mounted in the groove so that it has a delayed action effect with respect to letting liquid make its way along the inner face of the cylinder wall into the second low pressure space 42. If the piston 2 is moved towards the high pressure space 11, the piston ring 12 will be moved within the groove into a sealing position thereof and the liquid will not be able to make its way into the pressure space 42. If on the other hand the piston 2 is pushed along in the opposite direction, the piston ring 12 no longer makes sealing contact and it lets hydraulic liquid through out of the low pressure space 42 into the high pressure one 11.

In addition to the flow paths as noted so far, it is as well to have a bypass 51 joining the low pressure space 29 with the high pressure space 11. This bypass or shunt is only to be seen in FIG. 2 and is placed in parallel to the spill valve 13. The bypass may for example be a capillary opening in or on the part of the valve member with the coned face 19.

ACCOUNT OF OPERATION OF THE INVENTION

If the piston rod 3 is acted upon by a blow, the piston 2 will be pushed along into the high pressure space 11 so the liquid therein will be put under pressure. The check valve in the form of the piston ring or seal 12 will be shut but up to a certain pressure level the liquid in their high pressure space will be let off through the shunt 51. Once the pressure goes up past this level, the spill valve 13 will be opened. It is to be underlined that the valve 13 is worked by and dependent on the pressure as such and is not dependent on the rate of flow. When acted upon by such opening pressure, the valve member 18 is moved against the force of the Belleville washer spring 20 and moved clear of its seat member 14 so that a gap is opened up between the step 17 and the coned face 19 to let through liquid from the high pressure space 11 into the first low pressure space 29 so that by such flow the energy of the blow acting on the piston rod 3 will be damped or in other words the blow or impact itself will be damped. As noted hereinbefore the spring force of the Belleville washer spring 20 and for this reason the damping properties of the dashpot may be adjusted as desired by using the adjustment sleeve 24.

The volume of the second low pressure space 42 that is increased as the piston 2 is pushed inwards is filled up without any delay with hydraulic liquid, the amount of liquid forced out of the high pressure space 11 being greater than the increase in volume of the second low pressure space 42 by an amount dependent on the diameter of the piston rod 3. The balancing and return piston 32 is needed to make good and change in the overall volume of the low pressure space 42 and of the high pressure space 11 as such piston motion is going on and as noted is responsible for return motion of the piston. A further function of the piston 32 is to take care of changes in liquid volume caused by changes in temperature and of liquid losses caused by leaks.

When the force acting on the piston rod 3 comes to an end the pressure in the high pressure space will go down and the choke valve 13 will be shut. At the same time the effect of the pressure in the second low pressure space 42 or of inertia will be responsible for the piston ring 12 moving into its open position so that hydraulic liquid will now be able to make its way freely back into the high pressure space 11 and the piston rod will be indirectly moved back into its starting position.

The system of the present invention in which the high pressure space 11 is placed between or flanked by the two low pressure spaces 29 and 42 makes certain that the outer seals of the cylinder 1 are only acted upon by an unchanging low pressure level. This makes certain that the dashpot is completely sealed off from the outside and that there is no chance of any liquid loss therefrom. Furthermore there is very little chance of the dashpot being burst by rough working conditions because as part of the teaching of the invention the pressure within the high pressure space 11 is limited by the adjustment of the check valve 13 with a pressure limiting function. A further point is that in the invention even when the piston 2 is moved at its highest possible speed, no vacuum is produced between the rod seal 22 and the piston seal ring 12 so that there is no danger of air being aspirated into the dashpot. In other words, the dashpot may be used for damping machine parts moving at a very high speed. A further useful design point in this connection is the very small mass of the piston 2, that is made possible because the spill valve 13 is made separate therefrom and is placed inside the cylinder 1. This at the same time makes it possible for the damping effect of the dashpot to be adjusted while the dashpot is working, such adjustment being simply effected by turning the adjustment sleeve 24.

A further useful effect of the invention not to be overlooked is the large damping oil volume and the large amount of the oil that is pumped so that the specific load on the oil is lower and there is good heat dissipation by convection. Because the parts of the dashpot of the invention are put in line axially the overall size is small. The space within the cylinder 1 is put to the best possible use and there are no ducts or pipes needed outside the cylinder 1. Lastly the damping property of the dashpot is very nearly linear. The damping force keeps at more or less the same value along the full stroke of the piston so that with the same integral energy absorption load peaks likely with present day machines and which may not be calculated, are taken care of. To take a general view it may be said in fact that the present invention makes possible a trouble-free and readily serviced dashpot, that is more specially designed for use in industrial plant.

It is to be noted that the spill valve is not limited to the design hereinbefore. In fact, a helical spring may be used in place of the Belleville washer spring 20. Furthermore the spring system may be supported directly on an adjustment sleeve and without any support or driving ring 23 therebetween, such sleeve being screwed into a thread on the cylinder.

I claim:

1. A shock damping hydraulic apparatus comprising a cylinder, a piston placed in said cylinder and sealingly fitting therein for axial motion therealong, a piston rod for moving said piston axially along in said cylinder when acted upon by an external force to be damped, cylinder space dividing means in said cylinder, said dividing means and said piston walling off a high pressure liquid space between them in said clinder, means walling off a low pressure space in said cylinder, a spring loaded spill valve for forming a hydraulic connection between said high pressure space and said low pressure space, return means for producing return motion of said piston and said piston rod thereof outwards in relation to said cylinder, a check valve for letting liquid off from said low pressure space into said high pressure space when such return motion is taking place, said spill valve having a pressure-dependent function and being positioned stationarily inside said cylinder.

2. The hydraulic apparatus as claimed in claim 1 wherein said spill valve comprises a valve seat fixed in place at an inner wall face of said cylinder, a moving valve member for use with said seat, and a spring for moving said member towards said seat.

3. The hydraulic apparatus as claimed in claim 2 wherein said spring is selected from the group comprising: a helical spring, a Belleville washer spring.

4. The hydraulic apparatus as claimed in claim 2 comprising a spring driving ring for supporting one end of said spring opposite to an end thereof bearing against said valve member, said driving ring being able to be adjusted in the axial direction of said cylinder.

5. The hydraulic apparatus as claimed in claim 4 comprising an adjustment sleeve having said driving ring screwed thereon so that said ring is kept from turning in relation to said cylinder, said adjustment sleeve being threaded and being able to be turned in relation to said cylinder.

6. The hydraulic apparatus as claimed in claim 5 wherein said adjustment sleeve has at least one radial hole therein and said clinder has opening means through the wall thereof for putting a tool into said hole and turning said adjustment sleeve for the adjustment of the axial position of the spring driving ring.

7. The hydraulic apparatus as claimed in claim 1 wherein said high and low pressure spaces are placed next to each other within said cylinder, said low pressure space being parted into first and second space sections both within said cylinder and with said high pressure space between them, said apparatus further comprising a duct joining together said two space sections, said duct running through said high pressure space.

8. The hydraulic apparatus as claimed in claim 7 wherein said high pressure space is placed generally halfway between ends of the said cylinder and parts of said cylinder between said ends thereof and ends thereof and ends of said high pressure space are taken up by said two space sections so that generally all of the cylinder is taken up by said space sections and said high pressure space.

9. The hydraulic apparatus as claimed in claim 8 comprising a piston seal ring in a groove cut in an outer face of said piston, said ring separating said second section from said high pressure space, said piston having at least one hole therein running from one side thereof into said groove.

10. The hydraulic apparatus as claimed in claim 9 wherein said piston seal ring is designed for functioning as said check valve in said groove.

11. The hydraulic apparatus as claimed in claim 10 wherein said duct is placed running along the center axis of said cylinder through the high pressure space.

12. The hydraulic apparatus as claimed in claim 11 wherein said duct is in the form of a tube having one end thereof joined to said piston for motion in said cylinder with said piston, another end of said tube running into said second section separated from said high pressure space by said spill valve, said tube forming a hydraulic connection between said first and second sections of said low pressure space.

13. The hydraulic apparatus as claimed in claim 12 having said tube positioned within and running through said spill valve.

14. The hydraulic apparatus as claimed in claim 13 wherein said valve member of said spill valve has a center hole therethrough on the axis of said cylinder, said tube running liquid tightly and slidingly through said center hole.

15. The hydraulic apparatus as claimed in claim 14 wherein part of said second space section is formed by the ring groove in said piston taking up said seal ring.

16. The hydraulic apparatus as claimed in claim 15 comprising a stuffing box means placed round and acting on said rod, said stuffing box means shutting off said second space section from the outside.

17. The hydraulic apparatus as claimed in claim 12 wherein one side of said piston has a blind hole therein in which one end of said tube is sealingly fixed, said blind hole having at least one generally radial hole branching off therefrom and running into said groove with said piston seal ring therein.

18. The hydraulic apparatus as claimed in claim 1 comprising a spring loaded piston for putting liquid in said low pressure space under a piston return pressure.

19. The hydraulic apparatus as claimed in claim 18 wherein said spring loaded piston is made with a tail thereon running along said cylinder as far as a point generally outside said cylinder, said tail comprising a filling valve therein for topping up said cylinder with hydraulic liquid or fluid.

20. The hydraulic apparatus as claimed in claim 2 comprising a bush screwed into said cylinder and having said spring resting against one end thereof, said bush being able to be turned in relation to said cylinder for changing its axial position in relation thereto and thereby adjusting said spring and adjusting the opening pressure of said spill valve.

* * * * *